Figure 1:
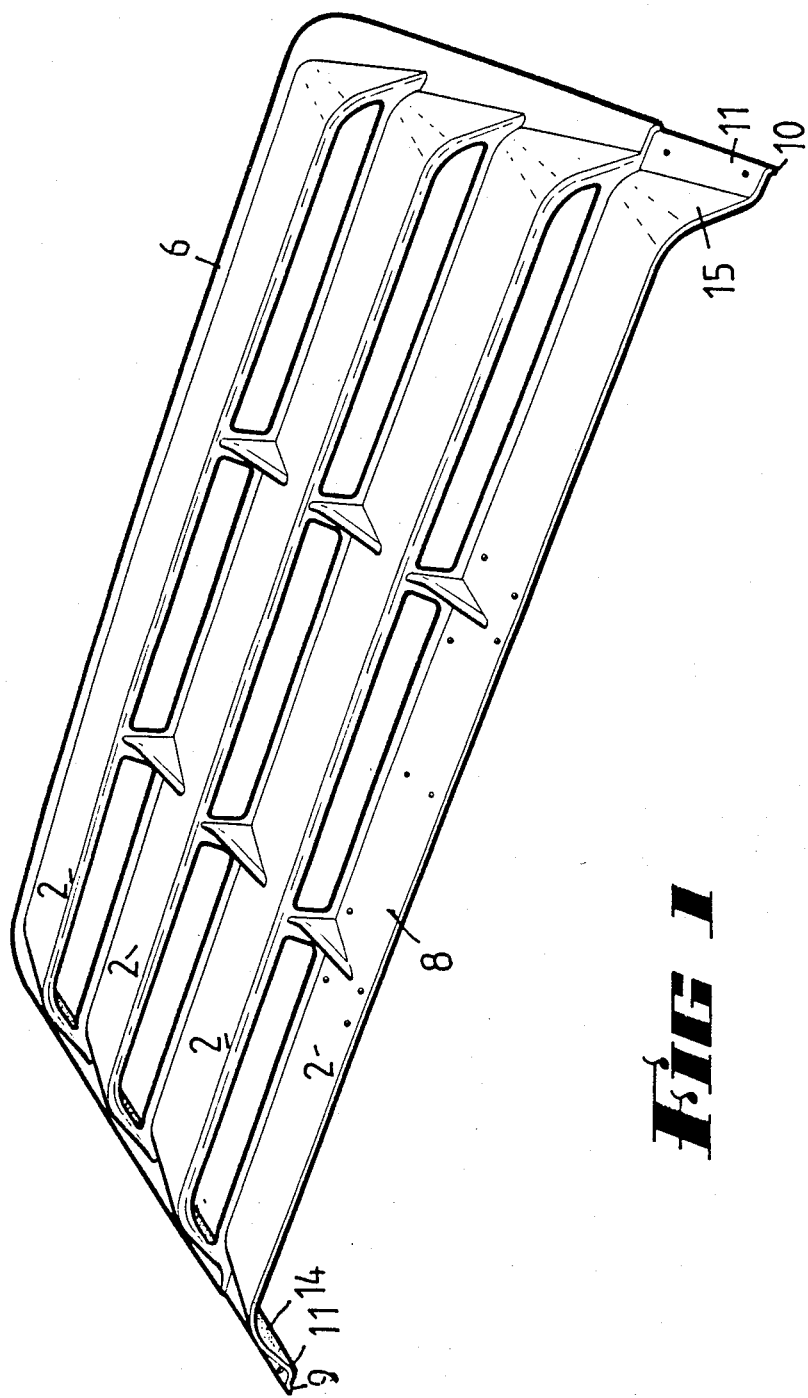

United States Patent [19]

Aunger

[11] Patent Number: 4,652,038
[45] Date of Patent: Mar. 24, 1987

[54] REAR WINDOW VEHICLE LOUVRES

[76] Inventor: Kim G. Aunger, 530 Fullarton Road, Netherby, South Australia, Australia

[21] Appl. No.: 765,009

[22] Filed: Aug. 12, 1985

[30] Foreign Application Priority Data

Aug. 10, 1984 [AU] Australia ............... PG6502
Feb. 11, 1985 [AU] Australia ............... PG9232

[51] Int. Cl.⁴ .............................................. B60J 3/00
[52] U.S. Cl. .................................. 296/97 A; 403/388
[58] Field of Search ............... 296/97 A, 97 R, 95 R; 49/61-64; 52/473; 403/388, 393

[56] References Cited

U.S. PATENT DOCUMENTS

| 4,006,933 | 2/1977 | Simpson | 296/95 R |
| 4,192,369 | 3/1980 | Taylor | 52/473 |
| 4,251,966 | 2/1981 | Foltman | 52/473 |
| 4,469,366 | 9/1984 | Deaver | 296/97 A |

Primary Examiner—Robert R. Song
Attorney, Agent, or Firm—Cushman, Darby & Cushman

[57] ABSTRACT

A louvre for a rear window of a motor vehicle constructed of two separate sheets of plastics material the join providing a strengthening and stiffening spine across the louvre.

8 Claims, 10 Drawing Figures

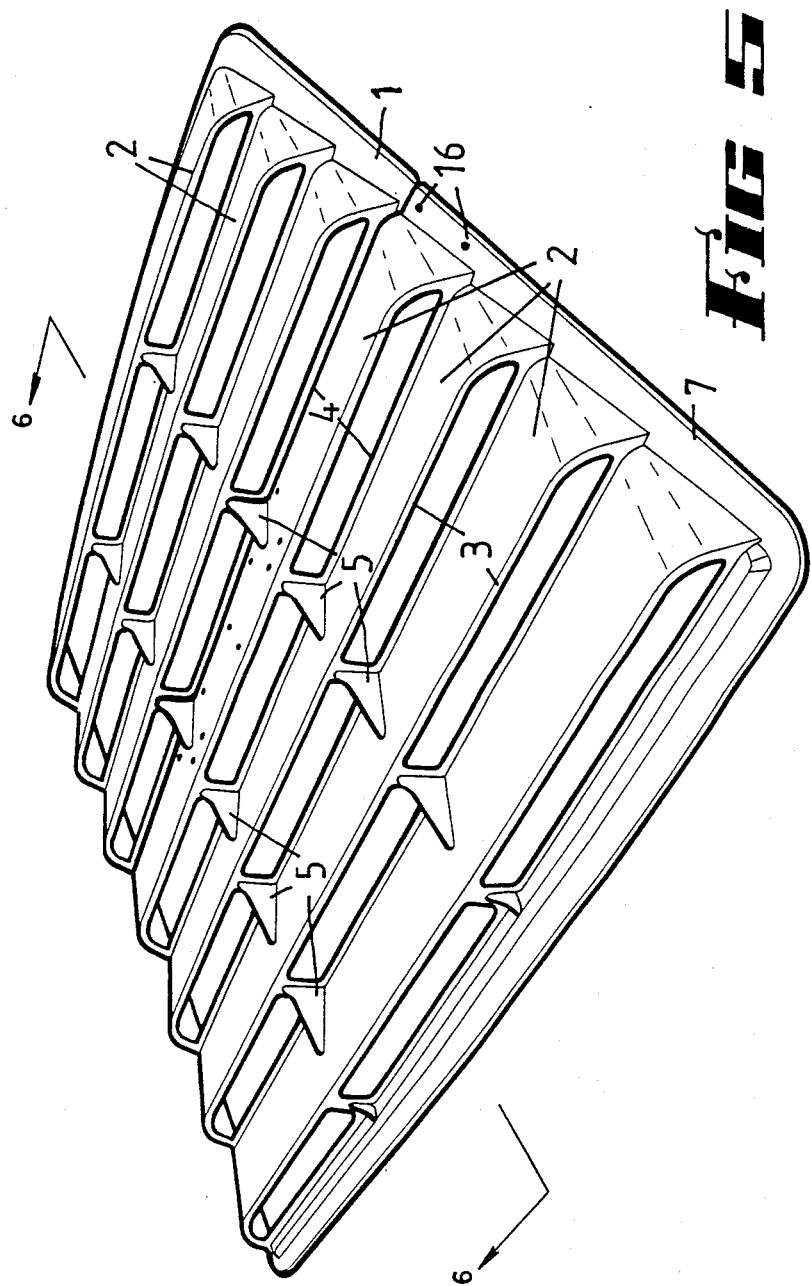

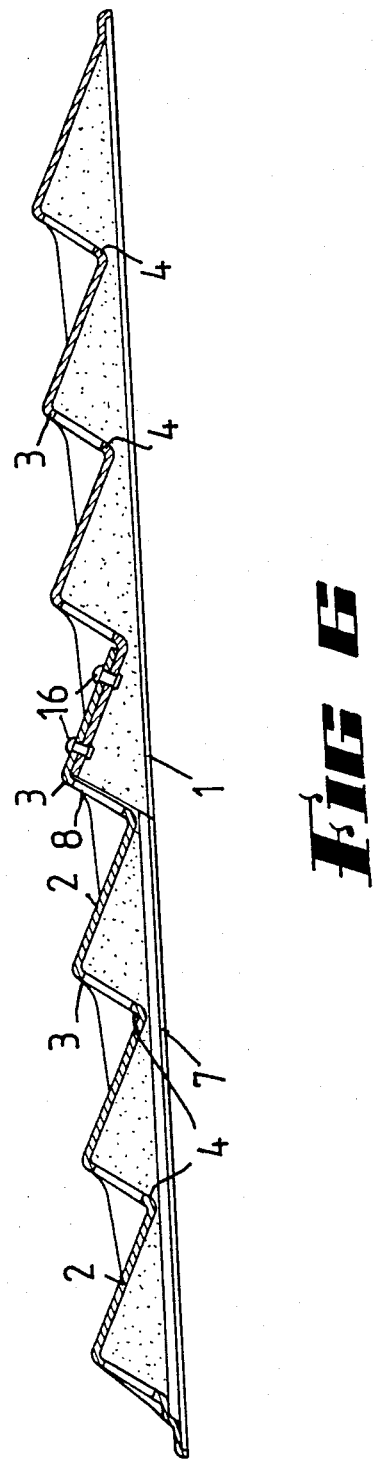

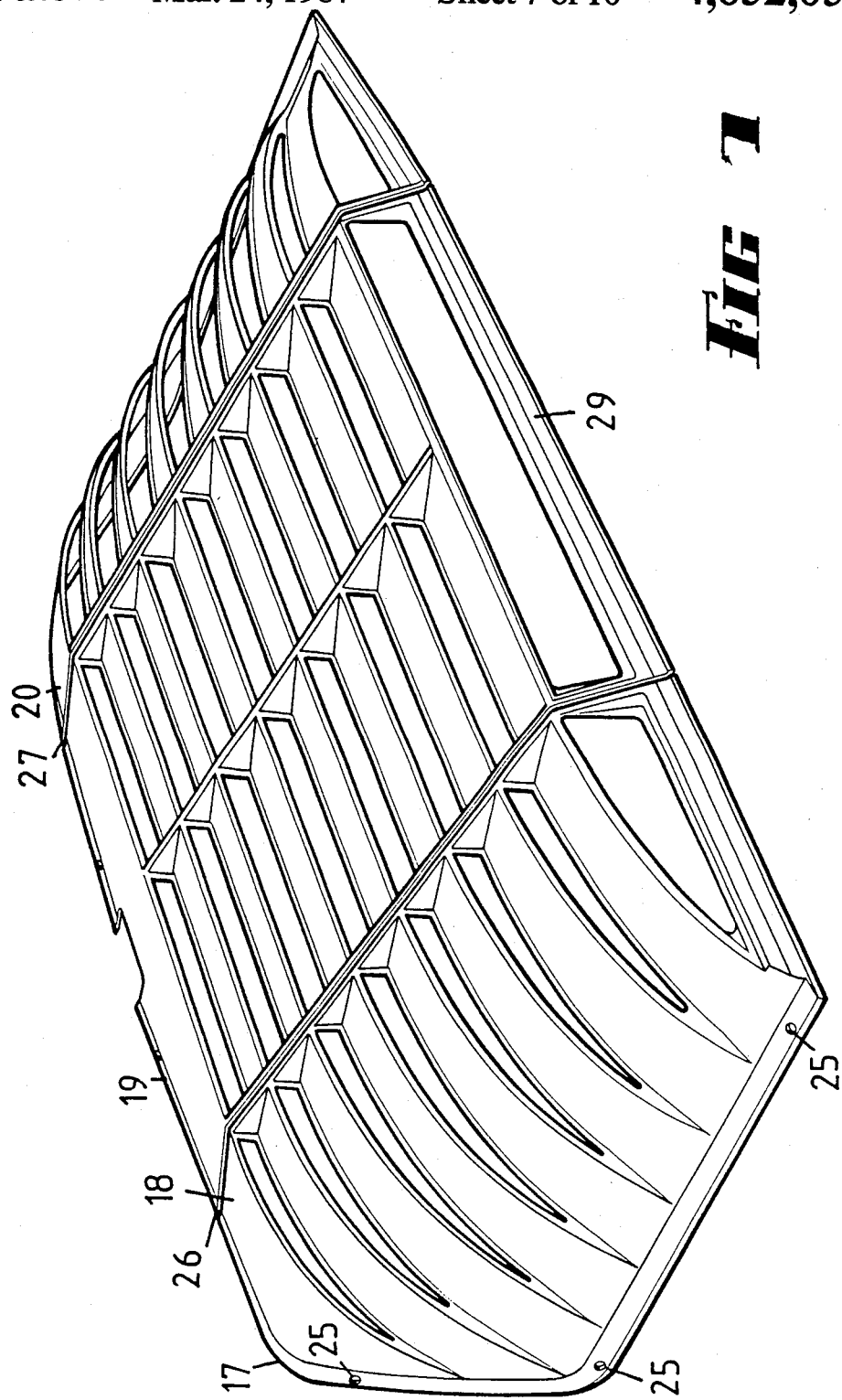

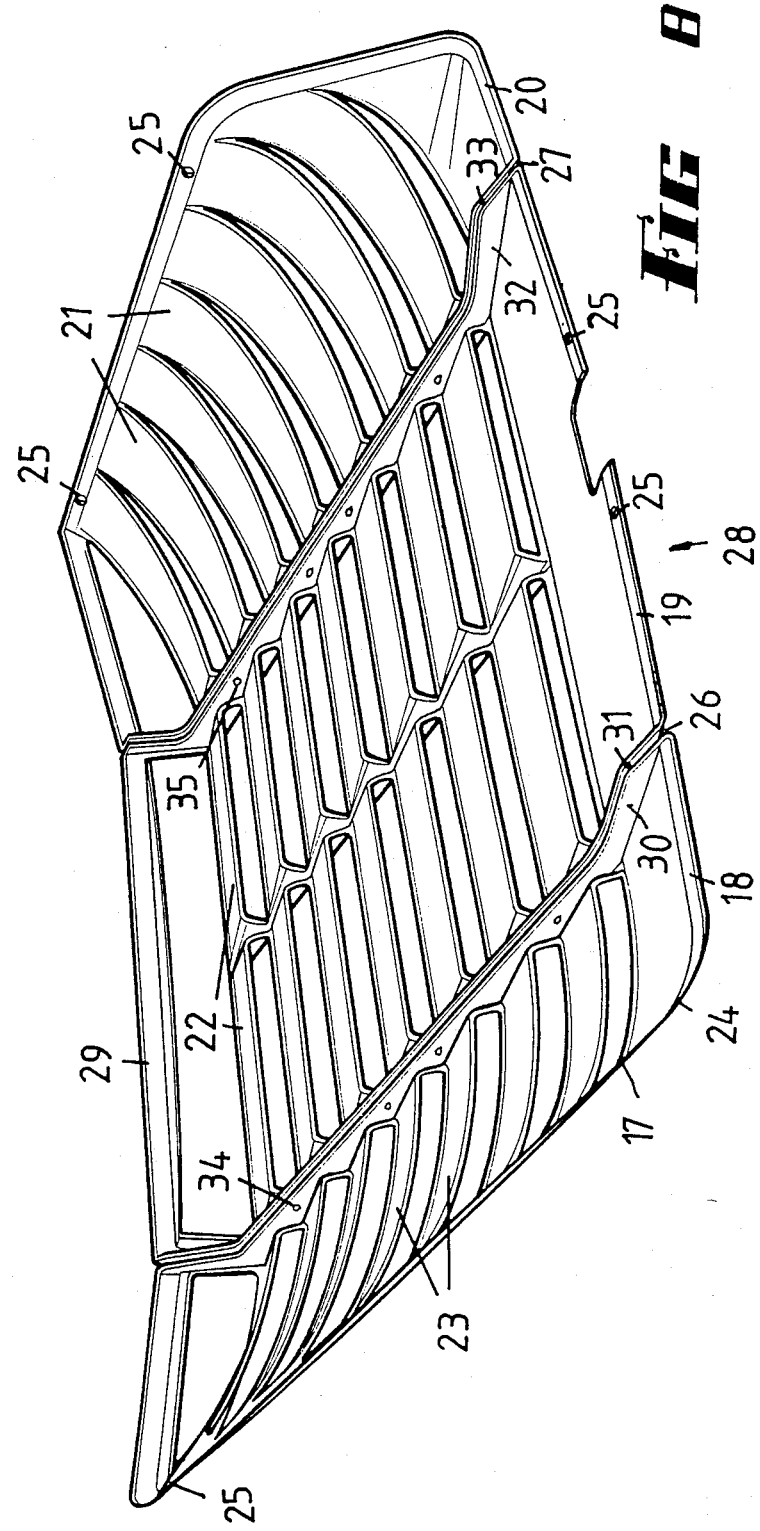

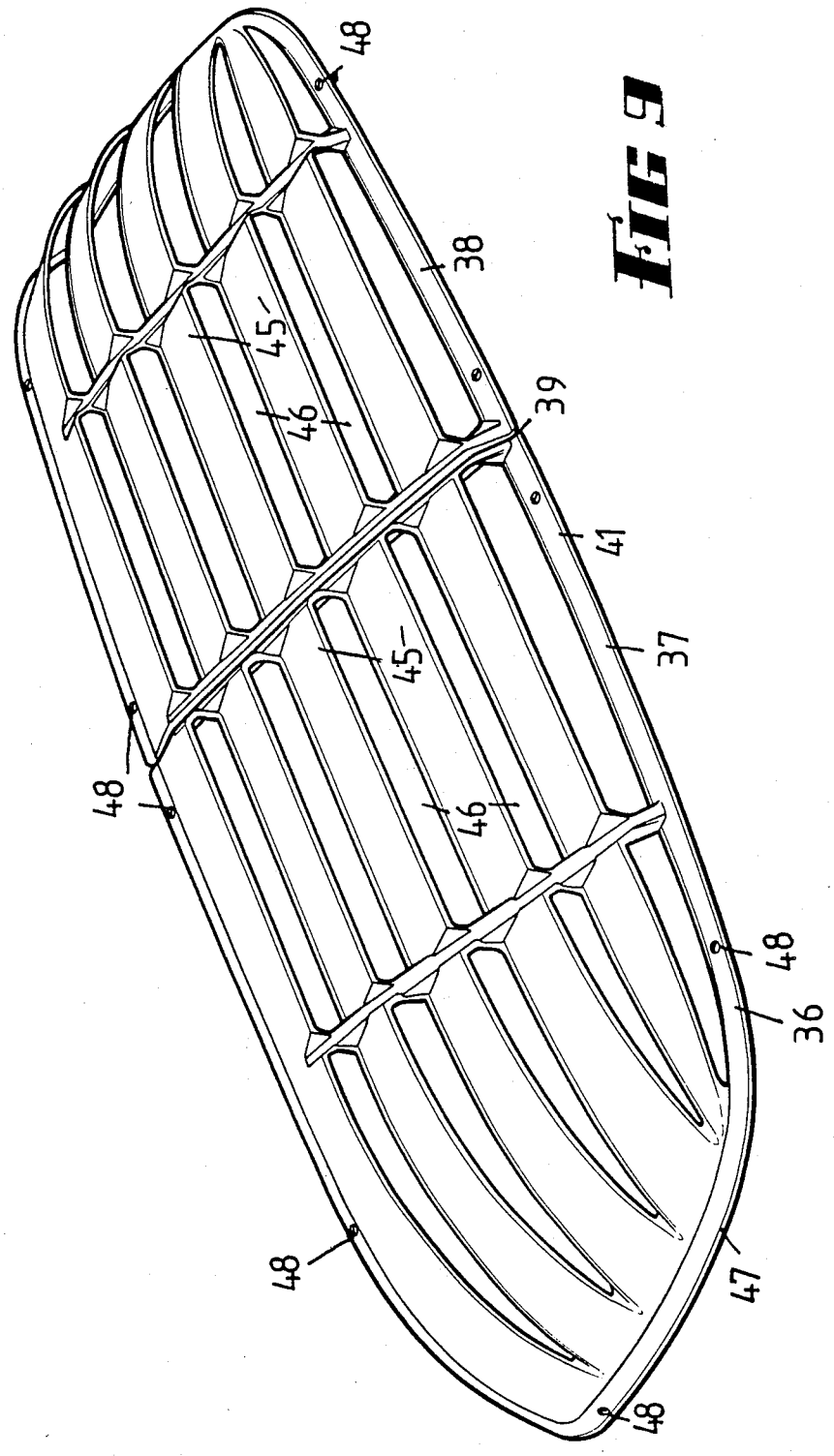

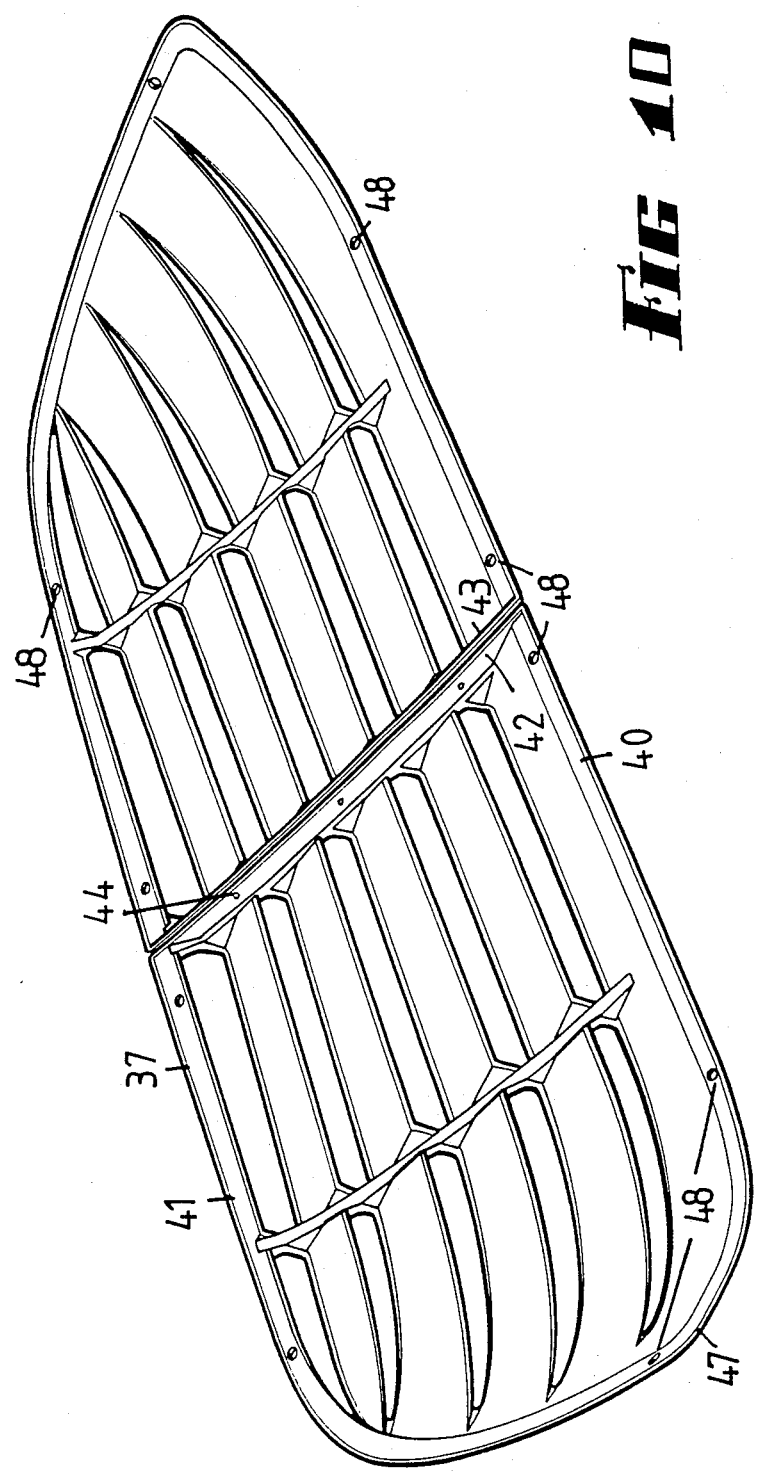

REAR WINDOW VEHICLE LOUVRES

This invention relates to louvres applicable to use across the rear window of conventional vehicles to provide shade over otherwise exposed glass of the said window.

The concept of providing such rear window louvres is not of itself new but there are presently many difficulties associated with both the manufacture, transporting in commercial economic quantities such louvre units after manufacture to any distribution location, and finally the use of such louvre units at the rear of a conventional motor vehicle.

For economical manufacture, I have discovered that to manufacture a unit suitable for the application, this has hitherto been best achieved by taking a single sheet of plastics material such as but not limited to that available under the descriptive reference "ABS" and while subjecting this to heat, drawing this onto a mould by reason of differential air pressure.

Apertures between the respective louvre shapes are then cut in an appropriate manner and the product as such is then available for location against the external face of a rear window of the motor vehicle.

Problems with such a unit are numerous although the unit can be very economically manufactured The first significant difficulty relates to the conventional shape by which the louvres are formed so that a louvre unit is relatively easily able to flex about a transverse axis located midway between each side.

The problem here is simply that when such a louvre unit is secured to the rear window of a motor vehicle, in many situations where the vehicle is being driven along a road the wind can swirl catching the louvre so that in some instances, typically where it is flexible about the said transverse axis between each side or about a longitudinal axis, this can cause very substantial dislodging forces.

Many other methods of constructions of louvre units have been previously proposed and are indeed in use including individual elongate metal sheet strips held by commonly joining struts, or in another case an integrally moulded article of fibre reinforced plastic resin.

Such other techniques of manufacture are inherently considerably more expensive than the first technique described. The advantage of alternate techniques of manufacture of such louvre units is that they can be constructed so as to be somewhat more resistant to wind induced distortion and heat induced buckling, or they can have reinforcement shapes which are not governed by the limitation of the manufacturing process as in the previously described vacuum forming technique relevant to sheet plastic.

Without extensively discussing the criteria by which attempts have been hitherto made to avoid this vulnerability to wind caused distortion, it is enough to be said that this is a significant problem with the technique being discussed, and this invention is directed generally to a different approach to solving this problem.

It has also been found that there are advantages of the feature of this invention relating to an ability to subsequently package an item for transport in a considerably smaller volume than has been hitherto the case and this has further assisted the technical and economic advance of this concept.

This invention can be said to reside in a vehicle louvre unit adapted to be attached over a rear window of a vehicle and comprised, at least in the main, of at least two formed sheets of plastic material each of which has been formed and cut providing a plurality of blades and apertures between blades providing a louvre effect and means adapted to secure the louvre unit at a periphery of the louvre unit to the vehicle characterised in that the louvre unit is comprised of at least two portions, each of the portions being formed from a separate sheet of the plastics material and each portion providing louvres adapted to extend across a portion of a rear window of a motor vehicle and the several portions being joined along coincident adjoining faces aligned to extend from one perimeter edge of the louvre unit to an opposite perimeter edge.

One significant advantage of providing at least two separate portions each of which contribute effectively to the louvre or the louvre shape is that the joining technique inherently provides for two thicknesses of the plastic material sheets which can either be in the form of a deep flange or can be face upon face providing a double thickness which acts as a spine across the width or height of the louvre unit.

The technique of joining the coincident adjoining faces can be any suitable technique such as but not intended to be limited to riveting by engaging rivets through mutually aligned apertures in the adjoining faces.

A problem has been to establish that such manufacture having several separable portions, can be combined providing both such significantly advantageously mechanical strength as well as providing an appearance and a shape which is both useful and commercially effective. In a preferred arrangement, the join can extend from a top of the louvre unit to a bottom of a louvre unit.

In a further preferred form, the join extends from one side of the louvre unit to the opposite side of the louvre unit.

In a further preferred form, there are three separate portions with two separate joins each extending from a top of a louvre unit to a bottom of the louvre unit.

Preferably, the coincident faces are located so as to define a plane extending between and along the adjoining faces which plane is transverse to a planar alignment of the louvre unit.

As it will be seen by reference to the preferred embodiments, resultant units can be made to look extremely attractive and yet because of the double thickness along a medial line, it is found that this significantly improves the stiffness and total strength of a louvre unit made from a selected thickness of plastic material.

Such stiffness is of vital importance in circumstances where large wind gusts that can be caused by passing trucks can rip behind the motor vehicle and by causing a buckling around a centre axis, lift a centre away from the vehicle rear window which in turn draws in the peripheral edges which therefore draw away from anchorage with surrounding rubbers by which the louvre is secured.

Figure 2:
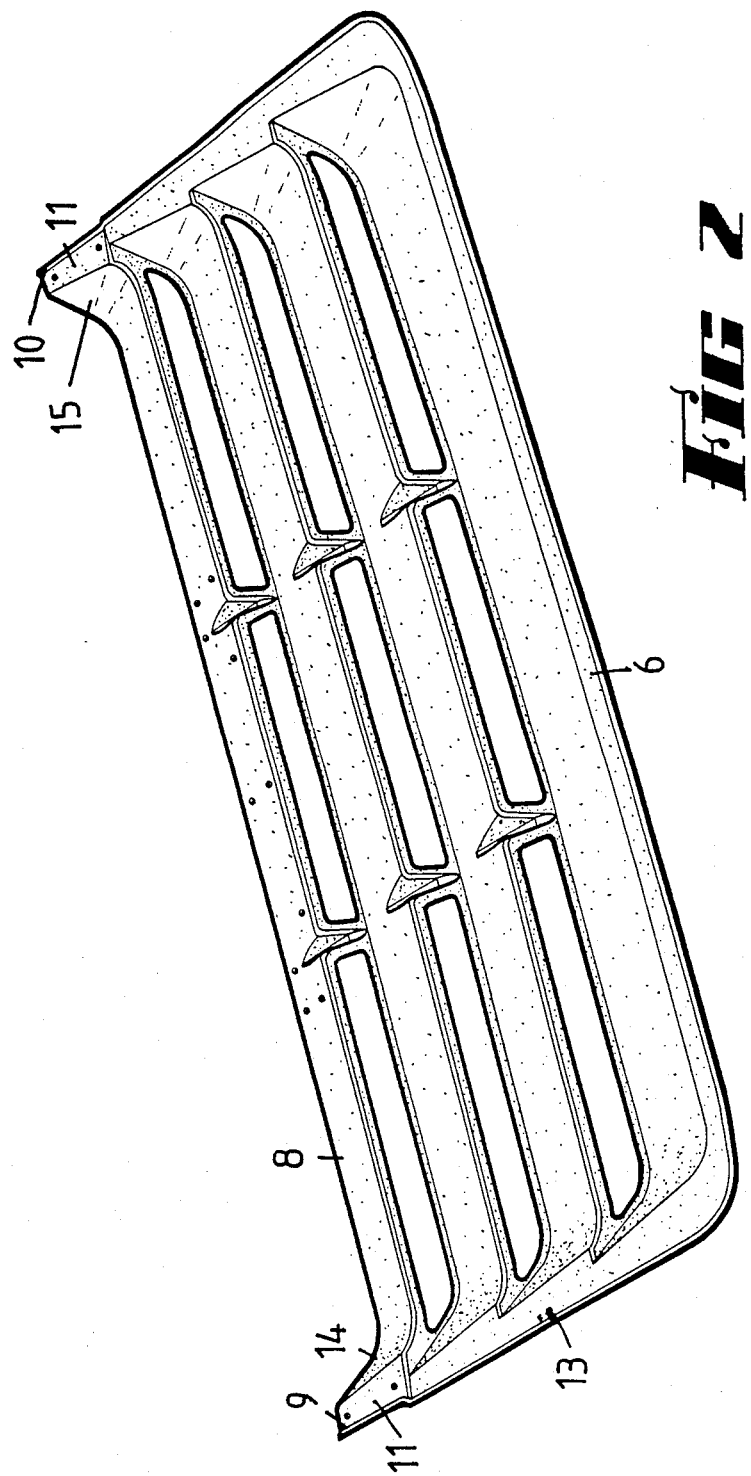
Figure 3:
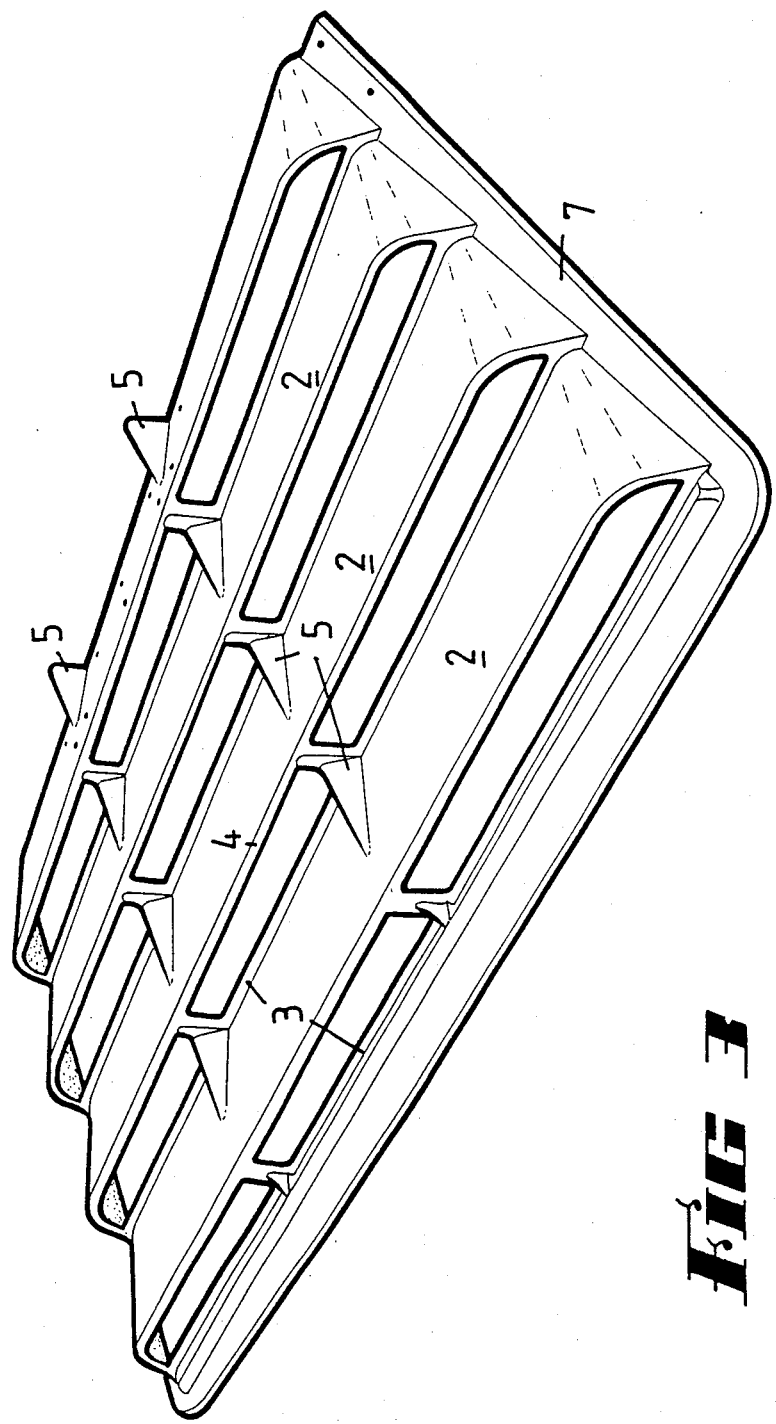
Figure 4:
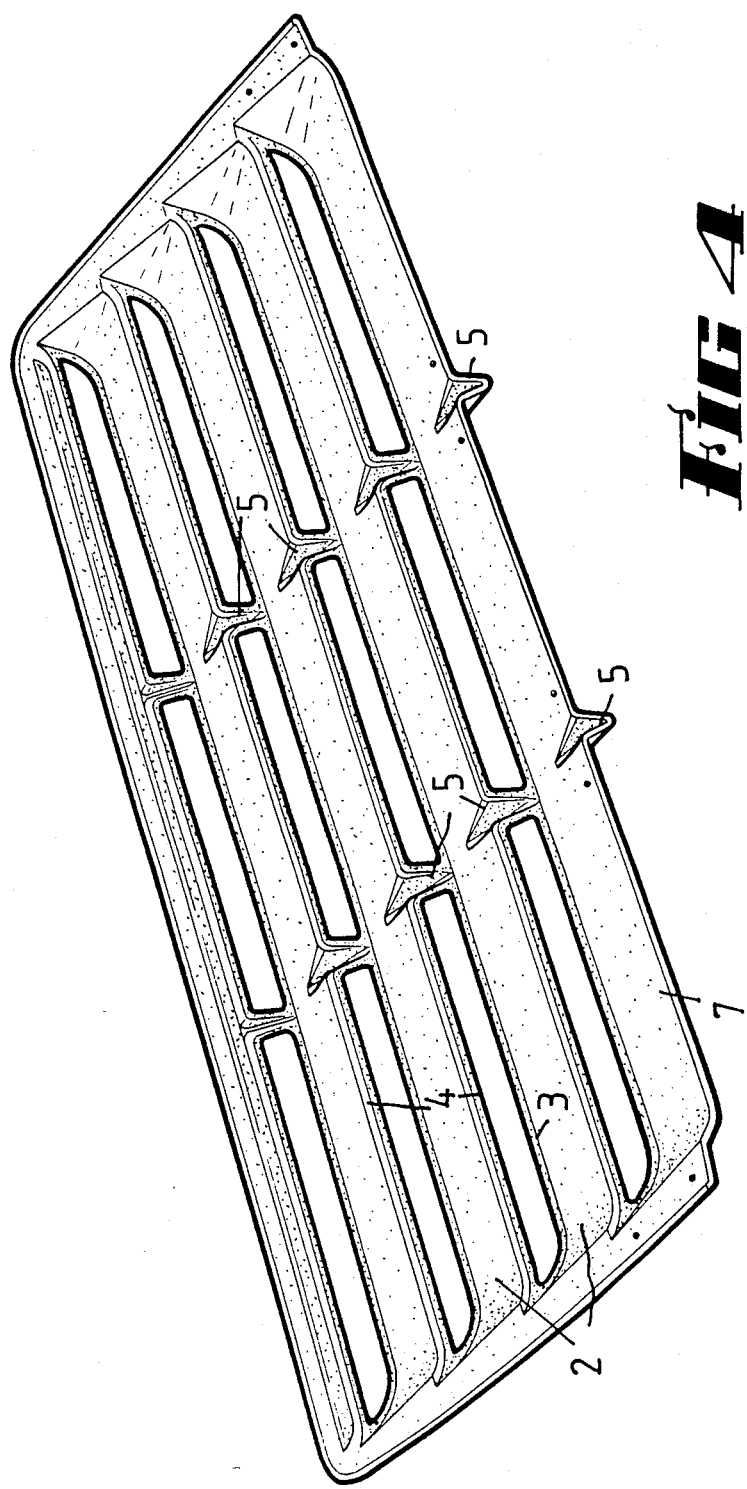

For a better understanding of this invention it will now be referred to the preferred embodiments which shall be described with the assistance of drawings wherein FIG. 1 is a perspective view from a side and slightly below looking at the outer side of an upper element of a rear window motor vehicle louvre unit, FIG. 2 is a perspective view of the same member as in FIG. 1 viewed from beneath the element, FIG. 3 is a perspective view of the outside of a lower element according to the same embodiment which is adapted to fit and combine with the upper element as shown in FIGS. 1 and 2, FIG. 4 is a view from the underneath side of the lower element as in FIG. 3, FIG. 5 is a perspective view of the outside of the assembled unit combining the upper and lower elements as previously referred to, FIG. 6 is a perspective view along the lines 6—6 of FIG. 5, FIG. 7 is a perspective view from an outside location of an outer face of a second embodiment, FIG. 8 is the underneath view of the unit comprising the second embodiment as shown in FIG. 7, FIG. 9 is a third embodiment this illustrating a perspective view of such a third embodiment and, FIG. 10 is an underside view of the third embodiment as shown in FIG. 9.

Referring in detail to the drawings and to the first embodiment, it will be seen that unit 1 provides a rear window louvre unit for a motor vehicle where there are two elements each of which is formed from a unitary sheet of plastics material in this case this being of a plastics material known in the trade as "ABS" and the louvres thus formed provide a plurality of broad louvre parts each provided by a blade portion 2 which has a front downwardly depending lip 3 and a rearwardly upward extending lip 4.

Located approximately a third inwardly from each side there is a stiffening shape combining a front of a first of the louvres to a more rearward location of the immediately forward blade. These connecting elements are shown typically at 5.

To provide for an effective coupling of the upper elements 6 with the lower element 7, the lower element 7 has its shape modified so that the uppermost edge of the broad louvre at its uppermost location is terminated without an upwardly rising lip.

The upper element 6 has its lowermost edge at 8 terminating without the downwardly depending lip that is otherwise located on the corresponding blades and furthermore at the rim both at 9 and 10 the downwardly depending lip is inset and the edge adjacent thereto at 11 and 12 is lower with respect to the remaining rim at 13.

Furthermore, the outermost edge of the blade is inset at 14 and 15 thereby of course making room in an accommodating way for the coincidence in a nesting fashion of the uppermost blade of the lower element 7.

It is advantageous that the shapes at 5 be of wedge shape and being terminated in the fashion shown also match the appropriate shape of the corresponding portion on the other element.

When the two elements, that is the upper element 6 is combined with the lower element 7, these can be held together as is shown in FIG. 6 by a conventional rivet assembly which can be located as is shown at 16 and while these provide some protrusion, by being appropriately coloured black and prferably made of a plastics material these can be both long lasting and inconspicuous.

This then describes the first embodiment from which it will be seen that by having a combination of the two elements which are each of a size that can be conveniently transported at a minimal cost but which can be very readily assembled at a retail outlet or at a service centre or even by an end user, this provides significant advantage in the art.

Referring now to the second embodiment as illustrated in both FIGS. 7 and 8, this includes a louvre unit 17 which is comprised of three separate portions 18, 19 and 20.

The portions 18 and 20 are of identical shape in reverse so as to provide two ends and the mid portion 19 extends between the two end portions 18 and 20.

Each of the portions 18, 19 and 20 are formed by vacuum forming from a sheet of plastics material of the type "ABS" and each includes a significant number of louvre shapes which includes louvre blades typically shown at 21, 22 and 23 and the unit 17 as a whole is bounded by a perimeter circumference shape at 24.

At spaced apart intervals around the perimeter shape 24 are apertures 25 by which pins which are not shown can pass through to engage the periphery with respect to the surrounded rear window of a motor vehicle.

The perimeter shape 24 is of course determined by a particular shape of a rear window of a motor vehicle and can be altered as appropriate to any different motor vehicle models.

In this particular case, the three separate portions which are of course formed from separate sheets of plastics material are combined together along two joins at 26 and 27 which extend fully from a top of the louvre unit 17 at 28 to a bottom of the louvre unit 17 at 29.

The join both 26 and 27 is achieved by having two coincident adjoining faces at 30 and 31 in the one case and 32 and 33 in the other which meet together and are held in this matching position by rivets passing mutually through the respective faces shown typically at 34 and 35.

The alignment of the plane is generally transverse to a general planar alignment of the louvre unit as a whole.

With this arrangement there is a significant stiffening of the louvre unit 17 at least against buckling about a transverse axis so that apart from the additional advantage of the three portions being of a more economic size for transport, there is the advantage of the structural feature.

Referring to the third embodiment as illustrated in FIGS. 9 and 10 the unit 36 comprises two portions 37 and 38 which are joined along a common medial alignment at 39 which join extends from a bottom 40 of the louvre unit 36 to a top at 41.

Each of the portions 37 and 38 have a transversely aligned ledge or face portion which matches with the oppositely and correspondingly positioned face so that the several faces at 42 and 43 which are aligned so as to define a plane therebetween which is transverse to the general planar alignment of the unit 36 can be held together in an appropriately simple way by rivets but which also once again provides significant stiffening against medial buckling around the transverse axis extending from side to side.

Once again, each of the portions 37 and 38 are formed from separate sheets of plastics material comprising "ABS" and each has a plurality of blades shown typically at 45 and apertures between respective blades at 46.

The shape once again of the unit is such as to define a periphery 47 which has a plurality of apertures 48 by which the periphery can be secured against the face of the rear window of a motor vehicle.

This then describes the third embodiment from which we will see once again that there can be provided significant advantageous arrangements achieving the objects of the invention and providing both economically effective and commercially viable results in respect of further units.

The claims defining the invention are as follows.

I claim:

1. A vehicle louvre unit adapted to be attached over a rear window of a vehicle and comprised at least in the main, of at least two formed sheets of plastics material each of which has been formed and cut providing a plurality of apertures between blades providing a louvre effect and means adapted to secure the louvre unit at a periphery of the louvre unit to the vehicle characterised in that the louvre unit is comprised of at least two portions, each of the portions being formed from a separate sheet of the plastics material and each portion providing louvres adapted to extend across a portion of a rear window of a motor vehicle and the several portions being joined along coincident adjoining faces aligned to extend from one perimeter edge of the louvre unit to an opposite perimeter edge, the join extending from one side of the louvre unit to the opposite side of the louvre unit.

2. A vehicle louvre unit as in claim 1 further characterised in that the coincident faces are located one above the other in a close nesting relationship.

3. A vehicle louvre unit as in claim 1 in which each of the portions is of approximately equal size.

4. A vehicle louvre unit as in claim 1 in which each of the portions is joined so as to reinforce and stiffen the louvre unit along such joins.

5. A vehicle louvre unit as in claim 1 in which the plastics material is "ABS".

6. A vehicle louvre unit adapted to be attached over a rear window of a vehicle, said unit having an upper edge and a lower edge defining between them a height dimension of the unit and having opposite side edges defining between them a width dimension, said edges forming the periphery of the unit and means for securing peripheral portions thereof to the vehicle, said unit being made of at least two portions each of which extends the entire height dimension of the unit and forms a portion of said upper edge and said lower edge of said unit and each of which is a single formed sheet of plastics material formed and cut so as to provide a plurality of louvres extending in the width direction of the unit, said sheets being joined along coincident adjoining faces aligned to extend from said upper edge to said lower edge.

7. A louvre unit as in claim 6 wherein said coincident faces lie in planes transverse to said upper and lower edges and wherein the coincident face of one sheet abuts the coincident face of an adjacent sheet, the faces being held in abutment by fastening members passing through said faces.

8. A vehicle louvre unit adapted to be attached over a rear window of a vehicle, said unit having an upper edge and a lower edge defining between them a height dimension of the unit and having opposite side edges defining between them a width dimension, said edges forming the periphery of the unit, means for securing the unit at peripheral portions thereof to the vehicle, said unit being made of at least two portions each of which extends the entire width dimension of said unit and includes portions of each side edge of said unit and each of which is a single formed sheet of plastics material formed and cut so as to provide a plurality of louvres extending in the width direction of the unit, said sheets being joined along coincident adjoining faces aligned to extend from one side edge to the opposite side edge.

* * * * *